United States Patent [19]
Cyrkiewicz et al.

[11] Patent Number: 5,736,608
[45] Date of Patent: Apr. 7, 1998

[54] PROCESS FOR THE MANUFACTURE OF POLYMERIC MATERIALS WITH A HIGH CHEMICAL AND MECHANICAL RESISTANCE AND POLYMERIC MATERIALS WITH A HIGH CHEMICAL AND MECHANICAL RESISTANCE

[76] Inventors: Marceli Cyrkiewicz, ul. Narubowicza 139 PL-90 146, Lodz, Poland; Erwin Herling, 817 Fifth Ave., New York City, N.Y. 10021; Jacek Kleszczewski, ul. Falista 157 - 94 115, Lodz, Poland

[21] Appl. No.: 564,203

[22] PCT Filed: Mar. 15, 1995

[86] PCT No.: PCT/PL95/00005

§ 371 Date: Apr. 17, 1996

§ 102(e) Date: Apr. 17, 1996

[87] PCT Pub. No.: WO95/28440

PCT Pub. Date: Oct. 26, 1995

[30] Foreign Application Priority Data

Apr. 19, 1994 [PL] Poland ................................ 303058

[51] Int. Cl.$^6$ ............................................. C08K 3/30
[52] U.S. Cl. .................. 524/779; 524/414; 524/423; 524/783; 524/789
[58] Field of Search ........................... 524/779, 783, 524/789, 414, 423

[56] References Cited

U.S. PATENT DOCUMENTS 4,151,000  4/1979  Bachelard et al. ................. 106/611

FOREIGN PATENT DOCUMENTS

89/07518  8/1989  WIPO .
95/00583  1/1995  WIPO .

OTHER PUBLICATIONS

Chemical Abstracts, vol. 104, No. 14, Apr. 7, 1986, Abstract No. 110705, Pashchenko et al., "Modified Phosphogypsum—an Active Filler for Plastics", see abstract & Stroit, Mater, Konstr., No. 3, 1984, p. 14.

Derwent Publications Ltd., London, GB; AN 91–278959 & SU–a–1 599 406 (Metal Protection) see abstract.

Derwent Publications Ltd., London, GB; AN 89–136613 & SU–A–1 433 932 (Tashkent Poly) see abstract.

*Primary Examiner*—Vasu Jagannathan
*Assistant Examiner*—John J. Guarriello
*Attorney, Agent, or Firm*—Michael D. Bednarek; Kilpatrick Stockton LLP

[57] ABSTRACT

A process for the manufacture of materials with a high chemical and mechanical resistance in which for each 100 parts by volume of vinylester resin treated with 0.85–1.47 parts by volume of an accelerant in the form of cobalt naphthenate, there are added at least in two batches 50–900 parts by volume of an inorganic filler constituting previously roasted at a temperature not lower than 470 K disintegrated to a particle size of at least 30 μm phosphogypsum or a composition of phosphogypsum with glass-forming oxides or phosphogypsum with magnetite or phosphogypsum with microsphere, after which on continuous stirring there is added, if necessary, up to 60 parts by volume of styrene and/or up to 0.2 parts by volume of dimethylaniline, and then the whole is polymerized in the presence of know initiators such as organic peroxides. The materials with a high chemical and mechanical resistance constitute polymerized composition of synthetic resin and inorganic fillers, consisting of 7.5–88.1% by weight of vinylester resin, styrene and/or a low-molecular-weight unsaturated polyester resin in a quantity up to 34.1% by weight, and 14.3–86.6% by weight of phosphogypsum or 0.4–46.6% by weight of phosphogypsum and 6.4–44.8% by weight of glass-forming oxides or 4.6–53.5% by weight of microsphere or 5.5–42.1% by weight of magnetite. The process for the manufacture of these materials makes it possible to utilize industrial wastes resulted from production of phosphoric acid, while the material itself in all its varieties is characterized by a very good resistance to aggressive media, also at elevated temperatures, and suitable for processing by mechanical methods as well as for combining with other materials by using to that end an incompletely polymerized composition of the material.

13 Claims, No Drawings

PROCESS FOR THE MANUFACTURE OF POLYMERIC MATERIALS WITH A HIGH CHEMICAL AND MECHANICAL RESISTANCE AND POLYMERIC MATERIALS WITH A HIGH CHEMICAL AND MECHANICAL RESISTANCE

The subject of this invention is a process for the manufacture of polymeric materials with a high chemical and mechanical resistance, particularly suitable in chemical, electrochemical and non-ferrous metals industries, as well as a polymeric material with a high chemical and mechanical resistance.

It is commonly known that synthetic resins are used either as binders in building materials such as mortars and concretes or as components of chemo- or thermosetting composites containing in their composition fillers being many a time industrial wastes such as sawdust and smokebox ashes. Thus, Polish Patent Specification no. 65 677 discloses a floor mix containing 30–40% of polyester resins, about 5% of epoxide resins, 55–65% of mineral fillers and an accelerant and hardener, the whole showing a mass density of 2.2 kg/dm$^3$. There is also known a floor mix containing 100 parts of epoxide resins, 5–20 parts vegetable epoxy oil, 10–20 parts of xylene, 8–12 parts of triethanolamine, 200–400 parts of kermesite with a grain size of up to 5 mm and 20–150 parts of dry microspheres with a bulk density of 0.35–0.42 kg/dm$^3$, thermal conductivity 0.04–0.1 W/mK and compression strength 30–35 MPa. There are also commonly known problems in utilization of industrial wastes, including waste phosphogypsum resulted in considerable amounts from the manufacture of phosphoric acid from apatites. One of the utilization processes; in accordance with Polish Patent Specification no. 119 692, consists of elimination of radium, uranium, fluorine and phosphorous compounds from phosphogypsum through decomposition by means of phosphoric acid. Another process, according to Polish Patent Application no. P. 287 016, concerns the manufacture of gypsum from waste phosphogypsum by adding about 6 parts by weight of waste ferrous sulphate and about 4.7 parts by weight of barium chloride to 1000 parts by weight of waste phosphogypsum, and then calcinating the mixture with quicklime at temperature 350–500 K. Another Polish Patent Specification no. 147 599 discloses the manufacture of building phosphogypsum materials comprising the preparation of a binding slurry by mixing a thermally treated phosphogypsum with make-up water and adding antiefflorescent agents in the form of sulphonated polycondensating resins, organic and inorganic silicon salts alkali metals. It is also known from Polish Patent Application no. P. 283 240 that waste phosphogypsum can be combined with polyester resins to prepare a material which is characterizes by good mechanical and chemical resistance and low water and oil absorptions. According to Polish Patent Application no. P. 299 472 and P. 299 473, it is also possible to combine, in an anhydrous system, epoxide resins and/or polyester resins with phosphogypsum or phosphogypsum and glass-forming oxides or phosphogypsum and magnetite to prepare ceramic-like materials with special properties including good mechanical and chemical resistance, being easily formable, especially by casting, and showing good adherence to various materials such as wood, metals, glass, and susceptible to processing by machining, grinding and cutting, and suitable for a wide application. There is also known from U.S. Pat. No. 3,873, 492 a process for the manufacture of a mixed materials containing gypsum and a thermoplastic resin; the gypsum to be used for the mixture is previously powdered and impregnated with a polysulphone resin.

It has unexpectedly appeared that using waste phosphogypsum, but only after its previous thermal treatment, in a composition with vinylester resins, one can prepare materials with a very high resistance both to acidic and alkaline media, showing water absorption below 0.5%, Charpy impact strength over 1.55 kJ/m$^2$, bending strength over 15 MPa, compression strength over 75 MPa, thermal conductivity index below 0.485 W/mK, the materials being also safe to health and showing a radioactivity level corresponding to that of cement and red bricks. Moreover, when glass-forming oxides are added to the materials they are characterized by ability to absorb X-radiation with an energy of 45–55 keV and hard radiation with an energy of 0.6–1.25 MeV; if magnetite is added to the composition, the materials show magnetic properties and when microsphere is added to the composition, the resultant material is characterized by a low thermal conductivity and a density of below 0.8 kg/dm$^3$.

The process for the manufacture of materials with a high chemical and mechanical resistance by polymerization of a mixture of a synthetic resin with an inorganic filler in the presence of accelerants and polymerization initiators, in an anhydrous medium, according to the present invention consists in that to each 100 parts by volume of vinylester resin, treated with 0.85–1.47 parts by volume of an accelerant in the form of a styrene solution of cobalt naphthenate, 50–900 parts by volume of waste phosphogypsum previously roasted at a temperature not lever than 470 K and disintegrated to a particle size of below 30 μm, with a bulk density of 0.71–0.93 kg/dm$^3$, are added while continuous stirring, at least in two batches, and if necessary up to 60 parts by volume of styrene and/or a low-molecular-weight unsaturated polyester resin and/or up to 0.2 parts by volume of dimethylaniline are also added. Next, on continuous stirring, to the physicochemically homogenized composition a known organic peroxide in a quantity of 6.3–7.3 parts by volume is added as polymerization initiator, to obtain 130–780 parts by volume of a material resistant to the action of acids and bases, both concentrated and diluted ones, with an impact strength of over 1.85 kJ/m$^2$, bending strength over 35.4 MPa, compression strength over 106 MPa and water absorption below 0.61%. The resultant material, due to its properties, is perfectly suitable to make floors in rooms, including also accommodations under conditions occuring in chemical and electrochemical industries and in non-ferrous metal works, especially in departments of electrolytic refining.

In order to obtain the material in a form suitable for application, especially by the hydrodynamic method, as anticorrosive or protective coats, the physicochemically homogenized composition of vinylester resin with phosphogypsum is additionally processed similarly as in the manufacture of paints and lacquers, preferably in fine grinding mills with continuous operation, until the particle size in the composition is below 7 μm, then styrene in a quantity of up to 2.5% by volume and/or a low-molecular-weight unsaturated polyester resin in a quantity of up to 5% in relation to the volume of the whole mixture are added. Next, polymerization initiators are added to produce a material suitable for spraying onto surfaces and allowing in a single spray the formation of a coat with a thickness of at least 250 μm, which means a coat thickness feasible in using known coats not before at least two and usually four or five spraying runs.

The material with a high chemical and mechanical resistance, constituting a polymerized composition of synthetic resin and an inorganic filler, according to the present invention consists of 11.6–77.1% by weight of vinylester resin, 14.3–86.8% by weight of waste phosphogypsum, 0.67–3.74% by weight of an organic peroxide and up to 29% by weight of styrene and/or a low-molecular-weight unsaturated polyester resin.

A modification of the process for the manufacture of the material according to the present invention consists in adding, as an inorganic filler, at least in two batches, either previously roasted phosphogypsum alternately with glass-forming oxides or a physically homogenized dry composition or roasted phosphogypsum and glass-forming oxides consisting mainly of lead, silicon and barium oxides with particle size up to 25 µm and a bulk density of 3.9–4.1 kg/dm$^3$, with the weight ratio of phosphogypsum to glass-forming oxides being as 1:0.7–1.5. The addition of glass-forming oxides as a component to the inorganic filler makes it possible to produce a material which is capable to attenuate or absorb X-radiation with an energy of 0.55 keV and hard radiation with an energy of 0.6–1.25 MeV. In the case when the material is to be used as protective coating capable to attenuate or absorb the above mentioned radiation, the physicochemically composition of vinylester resin with phosphogypsum is additionally processed similarly as in manufacturing paints and lacquers, preferably in continuously operated fine grinding mills until the particle size is 7 µm and then 2.5% by volume of styrene and/or up to 5% by volume of a low-molecular-weight unsaturated polyester resin are added, after which polymerization initiators are added. The resultant material is characterized by a very good fluidity at the initial stage of polymerization, which facilitates its use for coating elements to be used as shields or screens protecting against radiation and requiring anticorrosive protection.

The material capable to attenuate and/or to absorb X-radiation with an energy of 55 keV and hard radiation with an energy of 0.6–1.25 MeV, constituting a polymerized composition of a synthetic resin and an inorganic filler, according to the present invention consists of 10.1–79.8% by weight of vinylester resin, 5.8–43.9% by weight of roasted waste phosphogypsum, 6.4–44.8% by weight of glass-forming oxides, containing mainly lead, silicon and barium oxides, 0.58–3.89% by weight of an organic peroxide and up to 29.8% by weight of styrene and/or a low-molecular-weight unsaturated polyester resin.

Another modification of the process for the manufacture of the material according to the present invention consists in that there is added as an inorganic filler, at least in two batches, either previously roasted phosphogypsum alternately with a microsphere or a previously physically homogenized dry composition of roasted phosphogypsum and microsphere, with a particle size of below 25 µm, with the weight ratio of phosphogypsum to microsphere being as 1:0.43–45. In order to prepare a material in a form suitable for applying as anticorrosive or protective coats, an inorganic filler with a particle size of below 7 µm is used. The addition of microsphere as a component of the inorganic filler makes it possible to produce a material also with density of below 0.8 kg/dm$^3$, being very resistant to chemical nad showing thermal conductivity below 0.24 W/mK, water absorption below 0.24%, which is particularly suitable for use in yacht—and shipbuilding industry, including protective and anticorrosive coatings.

The material in the form of a polymerized composition of a synthetic resin and an inorganic filler, according to the present invention consists of 7.5–88.1% by weight of vinylester resin, 0.4–38.2% by weight of roasted waste phosphogypsum, 4.6–53.5% by weight of microsphere, 0.43–4.40% by weight of an organic peroxide and 34.1% by weight of styrene and/or a low-molecular-weight unsaturated polyester resin.

Still another modification of the process for the manufacture of the material according to the present invention consists in adding, as an inorganic filler at least in two batches, either previously roasted waste phosphogypsum alternately with magnetite or a physically homogenized dry composition of previously roasted phosphogypsum and magnetite, with the weight ratio of phosphogypsum to magnetite being as 1:0.6–1.3. In order to produce a material suitable for hydrodynamic application, the physicochemically homogenized composition of vinylester resin, phosphogypsum and magnetite is processed similarly as in the manufacture of paints and lacquers, preferably by grinding in continuously operated mills. The resultant material, due to its high chemical resistance and very good mechanical properties as well as magnetic properties, is perfectly suitable for using in microelectronics, especially for manufacturing electronic microelements to be exposed to corroding media.

The material in the form of a polymerized composition of a synthetic resin and an inorganic filler, according to the present invention consists of 10.1–80.1% by weight of vinylester resin, 6.4–46.6% by weight of waste phosphogypsum, 5.5–42.1% by weight of magnetite, 0.58–3.9% by weight of an organic peroxide and up to 29.9% by weight of styrene and/or a low-molecular-weight unsaturated polyester resin.

The process according to the present invention in all its modifications makes it possible to manufacture materials characterized by very good physical and chemical properties, including a very good resistance to aggressive media, also at elevated temperatures, being also perfectly suitable for processing by mechanical methods, including grinding, cutting and machining. Moreover, the materials can be reused as fillers when the goods made of them are worn out. The process according to the present invention allowing the utilization of large amounts of wastes resulted from the production of phosphoric acid by the wet method from phosphorite ores and consequently protecting the environment, due to the very good performance characteristics and a wide range of application of the materials according to the invention, makes it possible at the same time to save natural raw material in many cases.

The materials according to the present invention can be optionally combined witch order materials such as wood, metals, glass, building materials, either directly at the polymerization stage or after preliminary setting, using the incompletely polymerized composition.

The present invention is further described by the following examples which do not limit the range of its application.

EXAMPLE I

To 2 dm$^3$ of vinylester resin, 0.029 dm$^3$ of 1% styrene solution of cobalt naphthenate is added on continuous stirring and then three batches are added in turns, 3.35 dm$^3$ each of waste phosphogypsum previously roasted at 493–498 K for 2.3 hours, with a bulk density of 0.9 kg/dm$^3$ and particle size below 25 µm, the whole mixture being stirred further for 15 minutes. Next, 0.13 dm$^3$ of benzoyl peroxide is added and the composition is stirred for 10 minutes at most to produce 8.85 dm$^3$ of a liquid material which if casted onto a foundation forms within 2 hours a floors with an impact strength of 1.93 kJ/m$^2$, a compression strength of 114 MPa and a bending strength of 37.9 MPa, suitable for use in copper electrorefining divisions.

EXAMPLE II

Proceeding as in Example I, the composition prior to polymerization is rubbed in a grinder for 40–50 minutes and then 0.22 dm$^3$ of Polimal 101 polyester resin is added, the whole is stirred for 10 minutes and after adding 0.135 dm$^3$ of benzoyl peroxide, the resultant polymerizable composition in a quantity of 9.05 dm$^3$ is applied by means of a spray-gun onto internal surfaces of steel or concrete tanks for copper electrorefining to produce in a single spray a uniform layer with a thickness of 320 μm, consisting of 21.7% by weight of vinylester resin, 75% by weight of waste phosphogypsum, 2.2% by weight of Polimal 101 polyester resin and 1.1% by weight of benzoyl peroxide.

EXAMPLE III

To 2 dm$^3$ of vinylester resin and 0.026 dm$^3$ of 1% styrene solution of cobalt naphthenate, being continuously stirred, two batches, 2 dm$^3$ each, of previously roasted at 600–605 K phosphogypsum are added alternately with two batches of glass-forming oxides, 0.55 dm$^3$ each, and then on stirring 0.2 dm$^3$ of styrene and 0.004 dm$^3$ of dimethylaniline are added. The resultant composition in a quantity of 5.85 dm$^3$, after adding 0.12 dm$^3$ of cyclohexanone peroxide, is used to form weights for skin-divers.

EXAMPLE IV

Proceeding as in Example III, the composition prior to polymerization is treated with 0.003 dm$^3$ of dimethylaniline for 0.7 hour on simultaneous rubbing, then to the whole, 0.06 dm$^3$ of styrene and 0.1 dm$^3$ of Polimal 101 polyester resin are added. The resultant composition with a density 1.869 kg/dm$^3$, in a quantity of 5.97 dm$^3$, after adding 0.12 dm$^3$ of benzoyl peroxide, is applied, as an equivalent of baryta coating, onto the walls of a radio-isotope chamber for wet investigations, to produce in a single gun spraying a coat with a thickness of 290 μm, consisting of 23.7% by weight of vinylester resin, 32.8% by weight of waste phosphogypsum, 41% by weight of glass-forming oxides, 0.6% by weight of styrene, 0.9% by weight of Polimal 101 polyester resin and 1% by weight of benzoyl peroxide.

EXAMPLE V

To 4 dm$^3$ of vinylester resin on continuous stirring, 0.047 dm$^3$ of 2% styrene solution of cobalt naphthenate is added an then during further stirring three batches of waste phosphogypsum, roasted at 515–518 K, 1 dm$^3$ each and microsphere 1.3 kg each are added in turns. Finally, on continuous stirring, 0.005 dm$^3$ of dimethylaniline and 0.15 dm$^3$ of Polimal 101 polyester resin are added. The resultant composition, after adding 0.27 dm$^3$ of benzoyl peroxide, is poured into moulds to produce floats to be installed in equipment used in harbours, especially for absorbing crude oil contaminations.

EXAMPLE VI

Proceeding as in Example V and using phosphogypsum and microsphere with a particle size of below 4 μm, 0.17 dm$^3$ of Polimal 101 polyester resin and 0.28 dm$^3$ of benzoyl peroxide are added to prepare a polymerizable composition suitable for application as protective coating of ship hulls, consisting of 42.5% by weight of vinylester resin, 22% by weight of waste phosphogypsum, 31.8% by weight of microsphere, 1.45% by weight of Polimal 101 polyester resin and 2.2% by weight of benzoyl peroxide.

EXAMPLE VII

Proceeding as in Example I, three batches of dry composition in a quantity of 8 kg are added, consisting of even weight parts of previously roasted at a temperature of 487–490 K waste phosphogypsum and magnetite with a particle size of up to 15 μm, and then on continuous stirring, 0.002 dm$^3$ of benzoyl peroxide and 0.1 dm$^3$ of styrene are added, completing the procedure as in Example I. The resultant polymerizable composition, consisting of 24% by weight of vinylester resin, 36.9% by weight of magnetite, 1% by weight of styrene and 1.2% by weight of benzoyl peroxide, is poured into moulds to produce within 5 hours cores suitable for use in microelectronics.

We claim:

1. A process for the manufacture of a material by polymerization of a synthetic vinylester resin with inorganic filler in an anhydrous medium in the presence of known accelerants and initiators of polymerization, wherein:

per each 100 parts by volume of vinylester resin, treated with 0.85–1.47 parts by volume of an accelerant in the form of cobalt naphthenate in styrene, on continuous stirring, an inorganic filler in the form of waste phosphogypsum is added in a quantity of 50–900 parts by volume at least in two batches;

said waste phosphogypsum having a bulk density of 0.7–0.93 kg/dm$^3$ and a particle size of 30 μm at most, previously roasted at a temperature not lower than 470 K;

then on further stirring for a period of at least 0.1 hour, if necessary, addition of at least one material of the group consisting of:

up to 60 parts by volume of styrene, an unsaturated polyester resin, and up to 0.2 parts by volume of dimethylaniline;

after which 6.3–7.3 parts by volume of a known polymerization initiator such as an organic peroxide is added to the whole composition.

2. A process according to claim 1, wherein as an inorganic filler, there is used a dry composition, containing per 1 part by weight of phosphogypsum, 0.7–1.5 parts by weight of glass-forming oxides, consisting mainly of lead, silicon, and barium oxides.

3. A process according to claim 1, wherein as an inorganic filler there are added phosphogypsum and glass-forming oxides, with the weight ratio of phosphogypsum to glass-forming oxides being as 1:0.7–1.5.

4. A process according to claim 1, wherein as an inorganic filler there is used a dry composition containing per each 1 part by weight of waste phosphogypsum 0.6–1.3 parts by weight by of magnetite.

5. A process according to claim 1, wherein as an inorganic filler there are added phosphogypsum and magnetite, with the weight ratio of phosphogypsum to magnetite being as 1:0.6–1.3.

6. A process according to claim 1 or claim 2 or claim 3 or claim 4 or claim 5, wherein the composition containing vinylester resin, an accelerant of polymerization and inorganic filler is processed as in the manufacture of paints and lacquers, in continuously operated grinding mills to obtain a particle size of below 7 μm, after which are added at least one of the materials in the group consisting of up to 2.5% by volume of styrene and up to 5% by volume of an unsaturated polyester resin followed by the addition of a known polymerization initiator.

7. A process according to claim 1, wherein as an inorganic filler there is used a dry composition containing per each 1 part by weight of waste phosphogypsum 0.43–40 parts by weight of microsphere.

8. A process according to claim 1, wherein as an inorganic filler there are added phosphogypsum and microsphere, with the weight ratio of phosphogypsum to microsphere being as 1:0.43–45.

9. A process according to claim 7 or claim 8, wherein the particle size of the inorganic filler is lower than 7 μm.

10. A material comprising a polymerized composition of a synthetic resin and an inorganic filler, consisting of 11.6–77.1% by weight of vinylester resin, 14.3–86–8% by weight of waste phosphogypsum, 0.67–3.74% by weight of an organic peroxide and up to 29% by weight of at least one material of the group consisting of styrene and an unsaturated polyester resin.

11. A material comprising a polymerized composition of a synthetic resin and an inorganic filler, consisting of 10.1–79.8% by weight of vinylester resin, 5.8–43.9% by weight of waste phosphogypsum, 6.4–44.88% by weight of glass-forming oxides, 0.58–3.89% by weight of an organic peroxide and up to 29.8% by weight of at least one material of the group consisting of styrene and an unsaturated polyester resin.

12. A process comprising a polymerized composition of a synthetic resin and an inorganic filler, consisting of 7.5–88.1% by weight of vinylester resin, 0.4–39.2% by weight of waste phosphogypsum, 4.6–53.5% by weight of microsphere, 0.43–4.4% by weight of an organic peroxide and up to 34.1% by weight of at least one material of the group consisting of styrene and an unsaturated polyester resin.

13. A material comprising a polymerized composition of a synthetic resin and an inorganic filler, consisting of 10.1–80.1% by weight of vinylester resin, 6.4–46.6% by weight of waste phosphogypsum, 5.5–42.1% by weight of magnetite, 0.58–3.9% by weight of an organic peroxide and up to 29.9% by weight of at least one material of the group consisting of styrene and an unsaturated polyester resin.

* * * * *

UNITED STATES PATENT AND TRADEMARK OFFICE
CERTIFICATE OF CORRECTION

PATENT NO.  : 5,736,608
DATED       : April 7, 1998
INVENTOR(S) : Cyrkiewicz, et al It is certified that error appears in the above-identified patent and that said Letters Patent is hereby corrected as shown below:

Column 7, line 5, delete "14.3-86-8%" and insert -- 14.3-86.8% --.

Signed and Sealed this

Sixteenth Day of February, 1999

Attest:

Attesting Officer

*Acting Commissioner of Patents and Trademarks*